(12) United States Patent
Goodman et al.

(10) Patent No.: US 7,535,669 B2
(45) Date of Patent: May 19, 2009

(54) DETECTION OF DATA CARTRIDGES IN AN AUTOMATED DATA STORAGE LIBRARY

(75) Inventors: Brian G Goodman, Tucson, AZ (US);
Stephen Jackson, Chicago, IL (US);
Lenore I Mackey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/298,327

(22) Filed: Dec. 9, 2005

(65) Prior Publication Data

US 2007/0133116 A1   Jun. 14, 2007

(51) Int. Cl.
*G11B 15/68* (2006.01)
(52) U.S. Cl. .................................. 360/92.1
(58) Field of Classification Search ........... 360/92.1; 700/218
See application file for complete search history.

(56) References Cited

U.S. PATENT DOCUMENTS

| 5,781,369 | A  | * | 7/1998 | Inazawa et al. | 360/92.1 |
| 6,356,803 | B1 | * | 3/2002 | Goodman et al. | 700/218 |
| 7,359,143 | B2 | * | 4/2008 | Murakami | 360/92.1 |

* cited by examiner

*Primary Examiner*—Tianjie Chen
(74) *Attorney, Agent, or Firm*—Dan Shifrin

(57) ABSTRACT

In an automated library, data cartridges, such as magnetic tape cartridges, are stored in storage cells or shelves and accessed by data storage drives. An accessor with a gripper transports cartridges between storage cells and storage drives. Cartridges on the library floor may damage the accessor. A cartridge sensor is provided and positioned to detect cartridges on the floor of the library. The sensor may be mounted to the base of the accessor, may be mounted to the gripper, or one or more sensors may be mounted proximate to the floor of the library. If the library includes more than one library frame, a sensor may be mounted proximate to the floor of each of one or more of the frames, thereby allowing for the location of a dropped cartridge to be identified.

13 Claims, 6 Drawing Sheets

DETECTION OF DATA CARTRIDGES IN AN AUTOMATED DATA STORAGE LIBRARY

FIELD OF THE INVENTION

This invention relates to automated data storage libraries and, more particularly, to detecting data cartridges on the floor in an automated data storage library.

BACKGROUND OF THE INVENTION

Automated data storage libraries are known for providing cost effective storage and retrieval of large quantities of data. The data in automated data storage libraries is stored on data storage media that are, in turn, stored on storage cells, shelves or the like inside the library in a fashion that renders the media, and its resident data, accessible for physical retrieval. Such media is commonly termed "removable media". Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a data storage cartridge, also referred to herein as a cartridge. An example of a data storage cartridge that is widely employed in automated data storage libraries for mass data storage is a magnetic tape cartridge.

In addition to data storage media, automated data storage libraries typically contain one or more data storage drives that store (write) data to and/or retrieve (read) data from the data storage media. Transport of cartridges between storage cells and storage drives is typically accomplished by one or more robot accessors. Such accessors have grippers for physically retrieving a selected cartridge from a storage cell within the automated data storage library and transporting the cartridge to a storage drive by moving in the X and/or Y directions.

While there are numerous ways in which different mechanical components in a library may fail, an important and potentially damaging incident occurs when a data cartridge is on the floor of the library, such as by being dropped the accessor/gripper. If the cartridge remains on the floor, it may interfere with movement of the accessor and possibly even cause the accessor to become jammed or derailed, resulting in a major library failure. Even if the accessor does not become jammed or derailed, if the library is not "aware" that the cartridge has dropped, the data contained on the cartridge is unavailable and essentially lost, at least temporarily.

If the accessor is transporting a cartridge to a storage drive to be read from or written to and the drive does not indicate that it has received the cartridge, the library controller can execute a "lost cartridge state" error recovery procedure (ERP) in which the source and/or destination locations may be checked for the cartridge by the accessor. If the checked locations are empty, the cartridge is assumed to be either in the gripper or on the floor. To determine which, the library controller may initiate a "put" operation in which the gripper attempts to put a cartridge into a drive or storage cell. However, trying to manipulate a potentially defective or damaged gripper or accessor is certainly not desirable and may cause further damage.

Consequently, a need remains for a safe and efficient method and system to detect cartridges on the floor of the library.

SUMMARY OF THE INVENTION

In an automated library, data cartridges, such as magnetic tape cartridges, are stored in storage cells or shelves and accessed by data storage drives. An accessor with a gripper transports cartridges between storage cells and storage drives. Cartridges are occasionally dropped onto the library floor by a human or by the gripper and, although the loss may not be immediately evident, damage to the accessor may result.

The present invention provides a cartridge sensor which is positioned to detect cartridges on the floor of the library. An error indication may then be generated If a cartridge is detected. Preferably, although not exclusively, the cartridge sensor is a cartridge memory reader capable of reading cartridge memories such as may be incorporated into many current data storage cartridges.

In one configuration, the sensor may be mounted to the base of the accessor and activated when the accessor is in motion. In another configuration, the sensor may be mounted to the gripper. The gripper may then be moved proximate to the floor of the library and the accessor moved within the library. In still another configuration, one or more sensors may be mounted proximate to the floor of the library. If the library includes more than one library frame, a sensor may be mounted proximate to the floor of each of one or more frames, thereby allowing for the location of a dropped cartridge to be identified.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
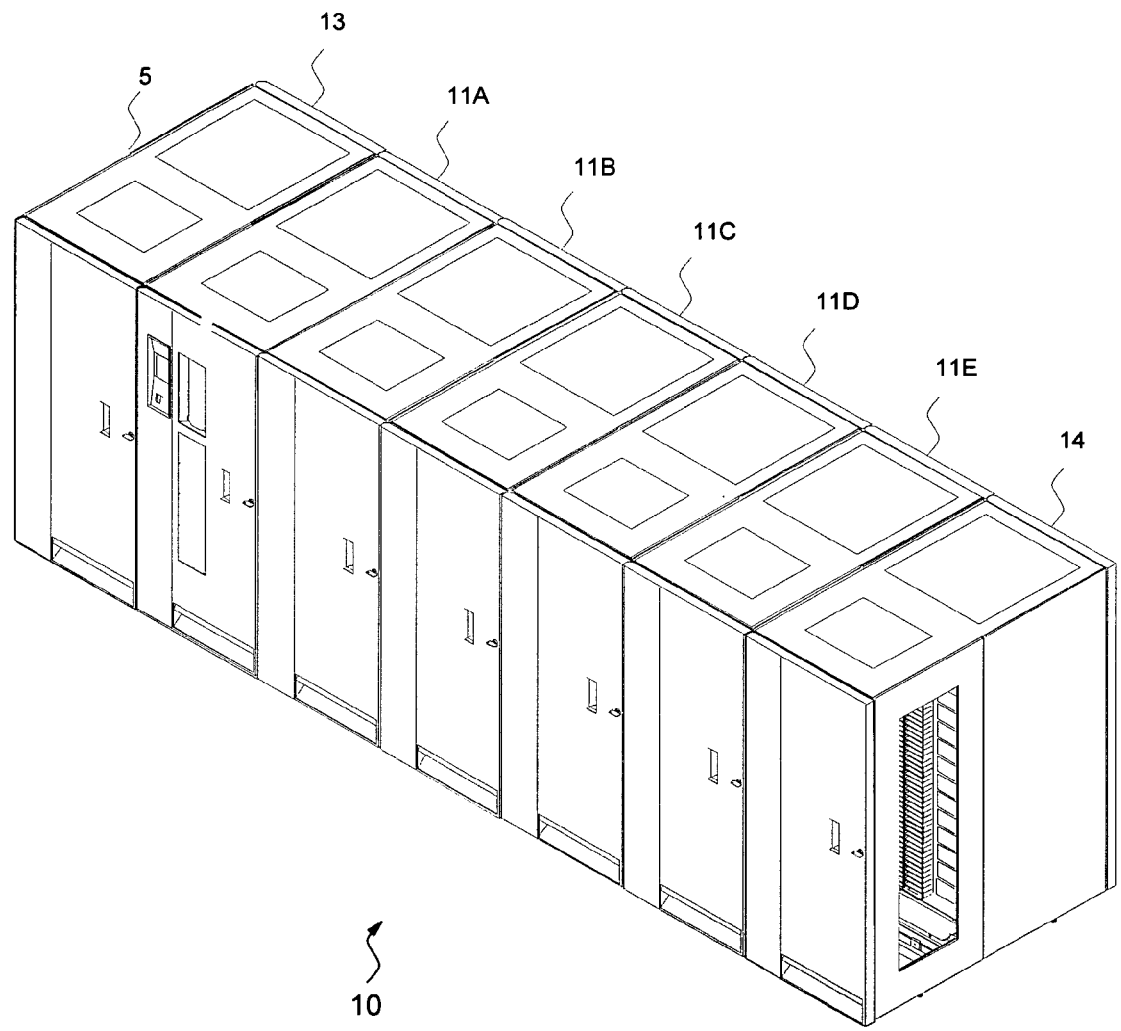
FIG. 1 is an isometric view of an automated data storage library adaptable to implement an embodiment of the present invention, with the view specifically depicting a library having a left hand service bay, multiple storage frames and a right hand service bay.
Figure 2:
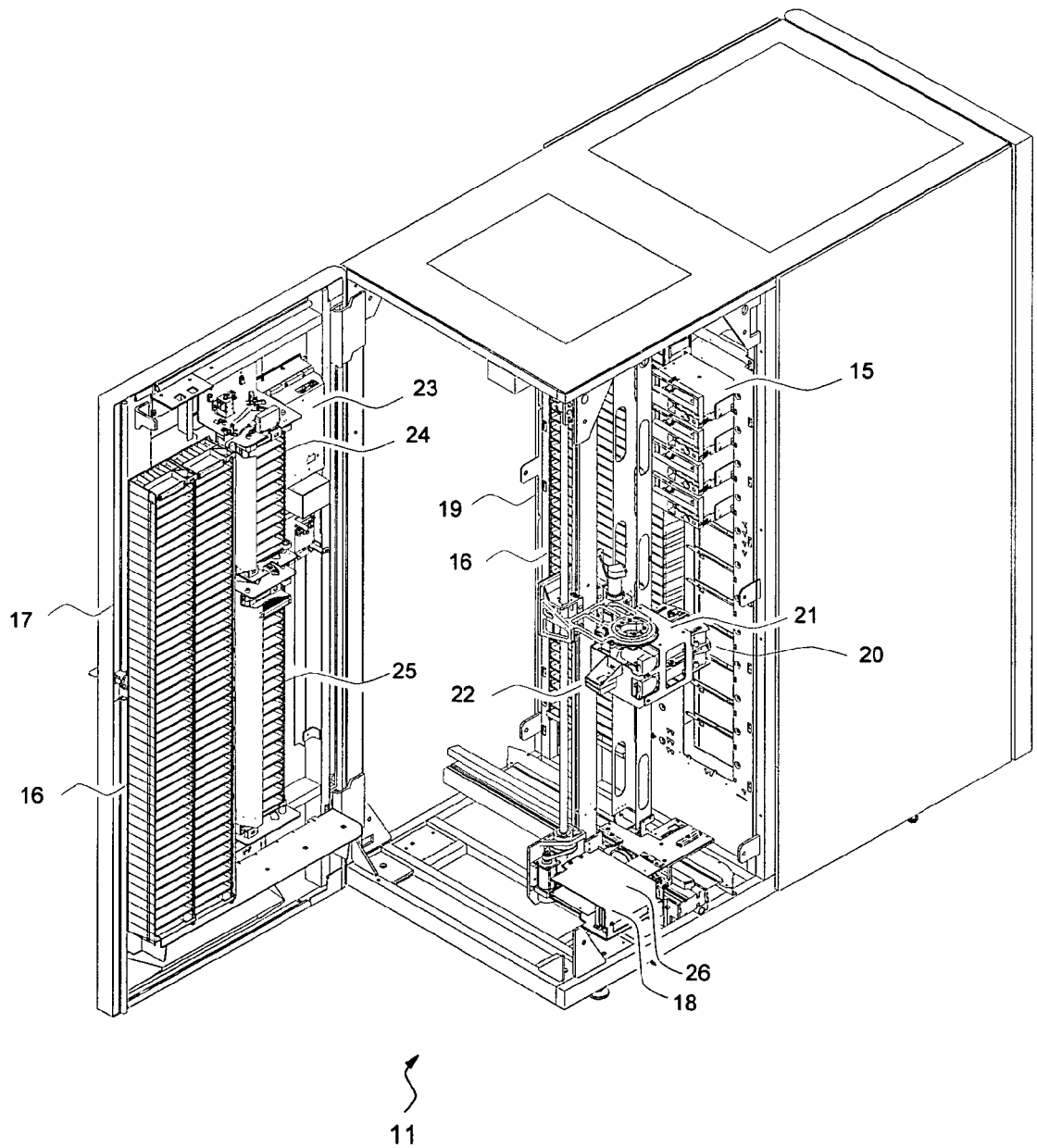
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 with a housing 5 in which data storage cartridges containing data storage media (not shown) are stored in and retrieved from storage cells or shelves 16. It is noted that references to "data storage media" herein also refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11A-11E (referred to herein generically as storage frame 11), and right hand service bay 14. As will be discussed, a frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16, on front wall 17 and rear wall 19 for storing data cartridges that contain data storage media; at least one data storage drive 15 for reading and/or writing data from/to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data from/to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage cartridges to be inserted into the library and/or removed from the library without disrupting library operation. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a base assembly 26, a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
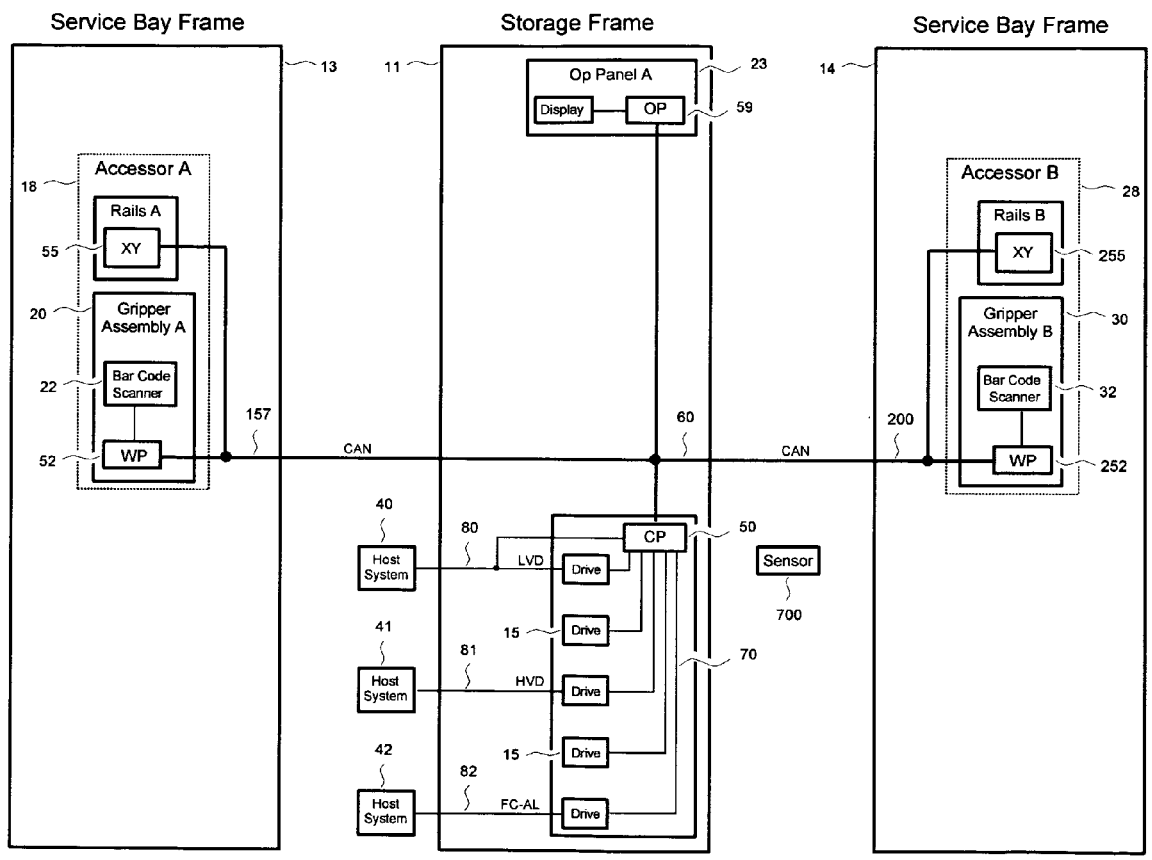
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein by reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first-accessor 18. The two accessors 18, 28 may share one or more mechanical paths or they may comprise completely independent mechanical paths. In one example, the accessors 18, 28 may share a common horizontal rail and have independent vertical rails. The first accessor 18 and the second accessor 28 are described as first and second for descriptive purposes only and this description is not meant to limit either accessor to an association with either the left hand service bay 13, or the right hand service bay 14.

In the library 10 illustrated as an example in FIG. 3, first accessor 18 and second accessor 28 move their grippers in at least two directions, called the horizontal "X" direction and vertical "Y" direction, to retrieve and grip, or to deliver and release the cartridges at the storage cells 16 and to load and unload the cartridges at the data storage drives 15.

The library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The library 10 is controlled by a distributed control system receiving the logical commands from hosts, determining the required actions, and converting the actions to physical movements of first accessor 18 and/or second accessor 28.

In the library 10, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives 15 and with host systems 40, 41 and 42. Alternatively, the host systems 40, 41 and 42 may be directly coupled to the communication processor node 50, at input 80 for example, or to control port devices (not shown) which connect the library 10 to the host system(s) with a library interface similar to the drive/library interface. As is known to those of skill in the art, various communication arrangements may be employed for communication with the hosts 40, 41 and 42 and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage cartridges, and an XY processor node 255 may be provided and may be located at an XY system of the second accessor 28. The second accessor 28 may run on the same horizontal mechanical path as first accessor 18 or on an adjacent path. The control system additionally may also comprise an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, the network 157 may not be associated with the left hand service bay 13 and the network 200 may not be associated with the right hand service bay 14. Depending on the design of the library and the particular needs of the customer, it may not be necessary to have a left hand service bay 13 and/or a right hand service bay 14.

Figure 4:
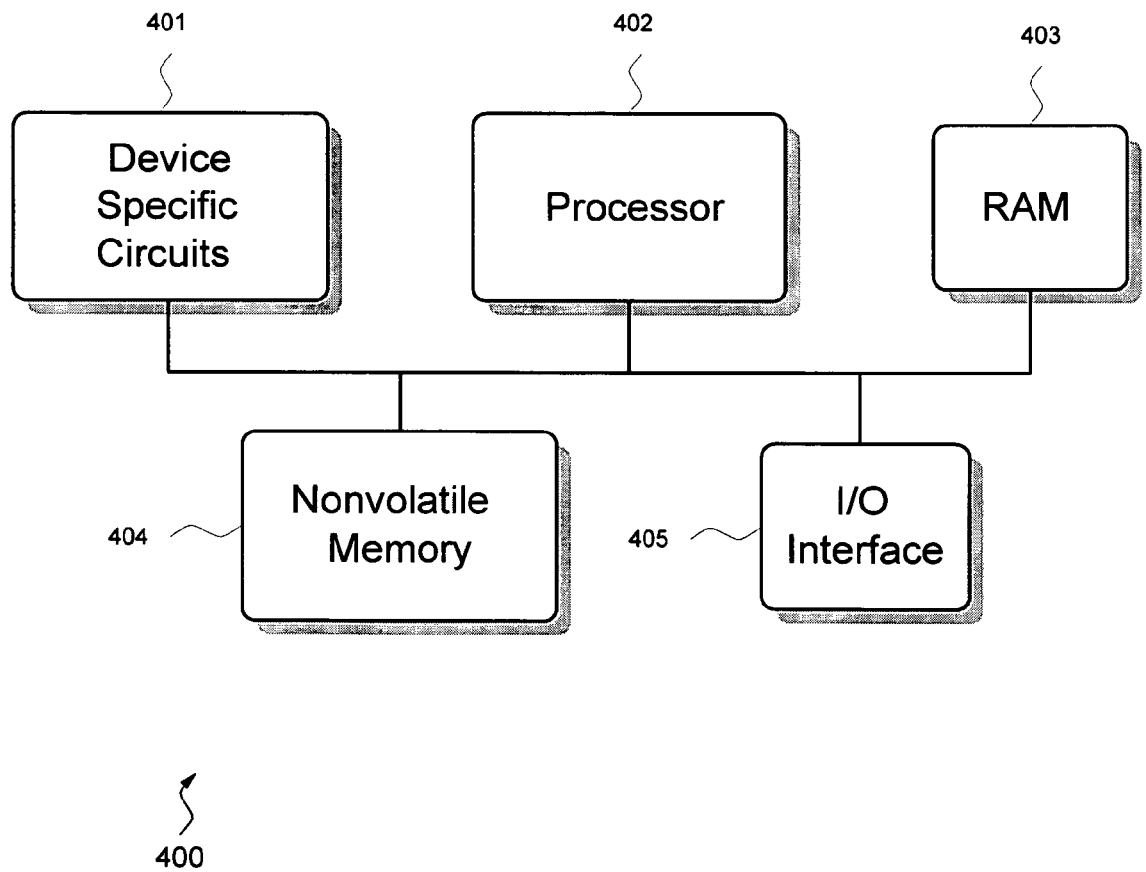
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not be limited to, an embedded system, a distributed control system, a personal computer, or a workstation, etc. Alternatively, one of the processor nodes 50, 52, 55, 59, 252, 255 may comprise a controller. In such a configuration, one of the processor nodes comprises the controller while any other processor nodes may work under the direction of the controller. Still further, two or more of the processor nodes 50, 52, 55, 59, 252, 255 may comprise a controller. In this further configuration, two or more processor nodes comprise the controller while any other processor nodes may work under the direction of the controller. Essentially, the term "controller" as used herein is intended in its broadest sense as a device or system that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), Fibre Channel, SCSI (Small Computer Systems Interface), CAN (Controller Area Network), Ethernet, etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Figure 5A:
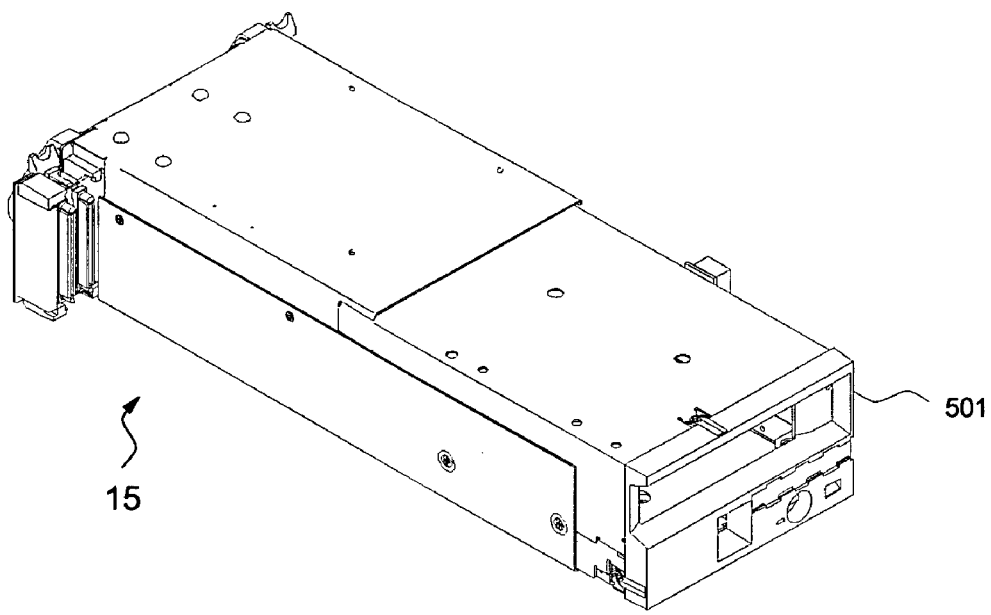
FIGS. 5A and 5B show front and rear isometric views, respectively, of a data storage drive adaptable to implement an embodiment of the present invention.
Figure 5B:
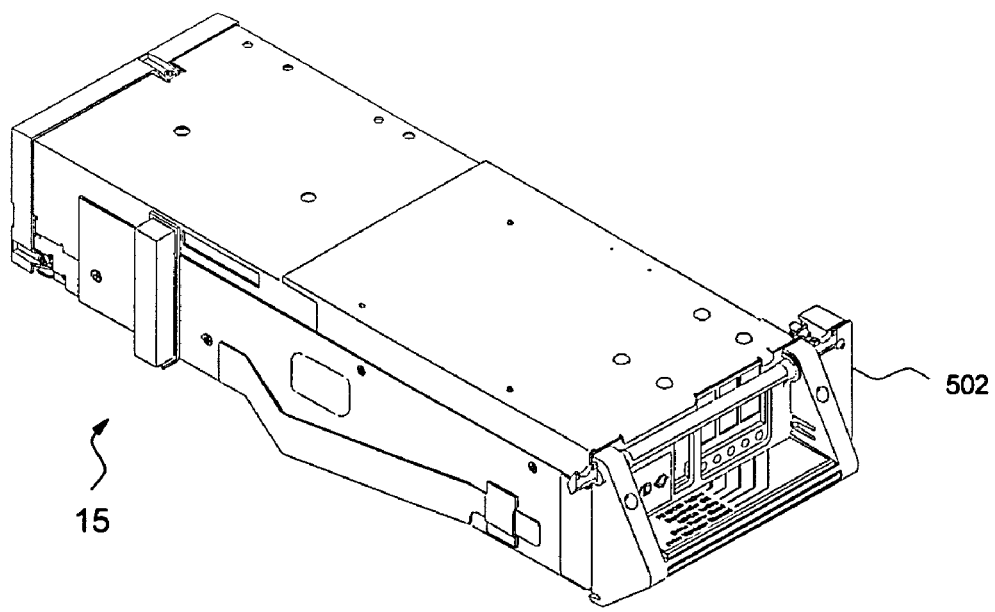

FIGS. 5A and 5B illustrate the front 501 and rear 502, respectively, of a data storage drive 15. In the example of FIGS. 5A, 5B, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
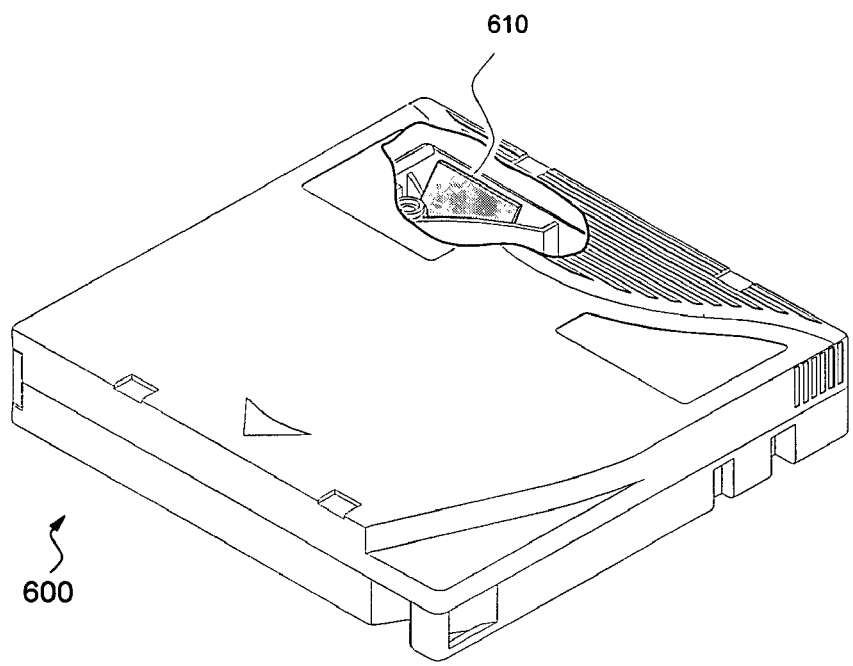
FIG. 6 is an isometric view of a data storage cartridge adaptable to implement an embodiment of the present invention with a portion cut-away to show a cartridge memory.

FIG. 6 illustrates an embodiment of a data storage cartridge 600 with a cartridge memory 610 shown in a cutaway portion of the Figure. Information may be written to as well as read from the cartridge memory 610. Such information may include, but is not limited to, a cartridge identifier, the cartridge type and the media type. During normal operations, a cartridge memory reader 21 (FIG. 2), which may be located on the accessor or gripper, is able to read the contents of the cartridge memory 610 when it is in close proximity thereto and can thereby confirm, for example, that the cartridge is the correct one to grip and transport to a storage drive. The cartridge memory may also be used as part of an inventory update when the cartridge is inserted into the library.

Figure 7:
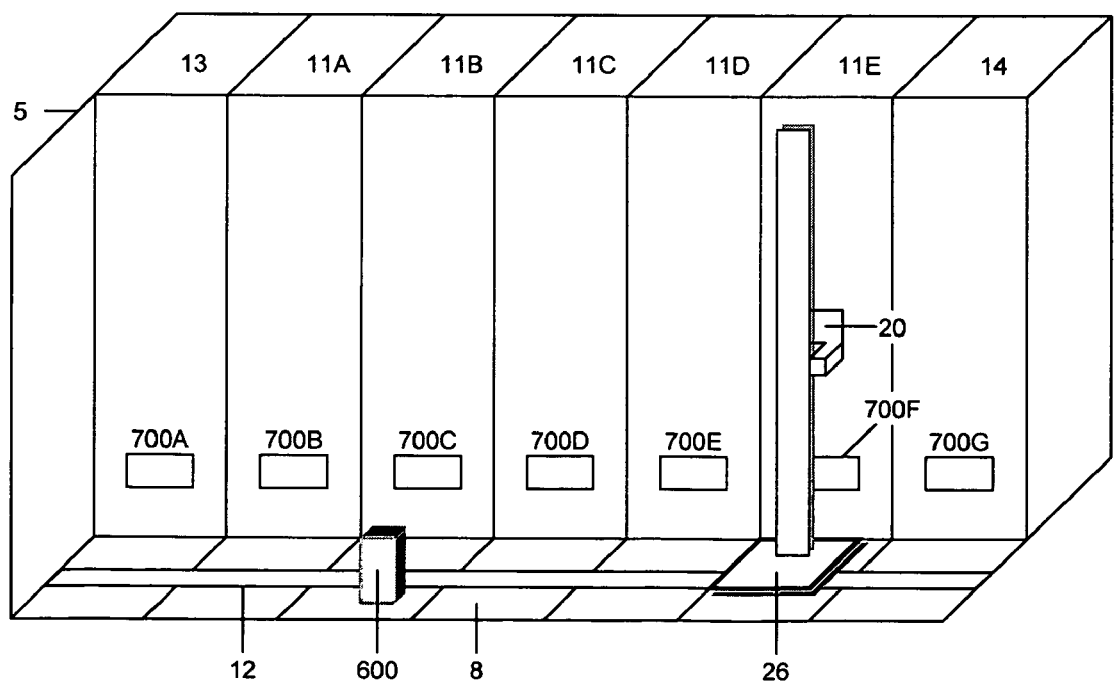
FIG. 7 is an isometric view of an automated data storage library adaptable to implement an embodiment of the present invention in which the front and top panels have been cut-away.

FIG. 7 illustrates the automated data storage library 10 of FIG. 1 in which front and top panels of the frames 11A-E, 13 and 14 have been cut away to show relevant internal components. For clarity, other components, such as storage cells 16, storage drives 15, details of the accessor 18 and other items, are not shown in the FIG. A data cartridge 600 is shown on the floor 8 of one of the frames 11B as a result perhaps of being dropped by the gripper 20 or being inserted improperly into a storage cell. If undetected and left on or near the rails 12 of the accessor 18, the cartridge 600 may cause the accessor to jam, derail or be damaged. Even if not in a position to cause a problem with the accessor, the data contained on the media within the cartridge 600 will not be available. A cartridge on the floor 8, whether left behind by a human or dropped by the library, is often not detected until the cartridge is actually needed by a host computer. As a result, it can take days, weeks, or even months before this situation is discovered, and even then, it may not be apparent what the root cause problem is. For example, a host computer may eventually instruct the library to move a cartridge that was previously dropped. In an attempt to follow the instructions of the host computer, the library may find the source location unexpectedly empty. This would result in the library reporting an error to the host computer. The problem is that such an error could have many different causes, such as hardware errors, bar code label read errors, firmware errors related to inventory management, dropped cartridges, etc. This can be particularly disruptive if the data center is operating in an unattended mode where it is not very convenient to have someone open a library door and look around.

The library 10 further includes a cartridge sensor which is positioned within the library 10 to detect the presence of a data cartridge on the floor 8 of the library 10. Preferably, the cartridge sensor is a cartridge memory reader having the same capabilities as the cartridge memory reader 21 located on the accessor 18 or gripper 20. One skilled in the art will recognize that a cartridge memory may comprise one form of an RFID tag, and a cartridge memory reader is one form of an RFID reader. Herein, cartridge memory may refer to an active or passive RFID tag or other type of wireless information-bearing storage. The RFID tag may be located on the outside of the cartridge, for example, integrated with a cartridge label or affixed to the cartridge shell. Alternatively, the RFID tag may be located inside the cartridge, for example, the cartridge memory 610 depicted in FIG. 6. Still further, the RFID tag may be integrated into the cartridge shell, for example, as part of the shell molding process. The RFID tag may comprise a simple detection tag, such as an anti-theft tag, or may comprise an information tag that includes information about the particular cartridge, such as a cartridge identifier, cartridge serial number, media type, media generation, information related to a label on the cartridge, etc. The information associated with the RFID tag may be static or fixed, or it may be dynamic or updateable by an RFID reader/writer of the library and/or the drive. The present invention contemplates the use of other types of cartridge sensors or detectors as well. The sensor may be coupled as an input to a communication processor node (CP) 50 to provide an indication to the CP 50 that a cartridge has been detected and ultimately to a system operator through, for example, the operator panel 23. Herein, CP 50 will be described as the library controller. As discussed above, any processor node 50, 52, 55, 59, 252, 255 may comprise a library controller. In addition, more than one processor node may work cooperatively to comprise a library controller. Still further, there may be one or more library controllers that are not distributed.

In one embodiment, the cartridge sensor includes one or more sensors 700A-700G (collectively referred to as the cartridge sensors 700) mounted proximate to the floor of the library 10 (if a single frame) or proximate to the floor 8 of each frame 11A-11E, 13, 14 (if the library 10 includes more than one frame). It should be noted that the antenna of the cartridge sensors 700 may be mounted in one location while other components associated with the sensors may be mounted in another location. For example, the antenna may be mounted proximate to the floor 8 of the library (as described above) while the control and/or power circuits may be mounted at or near CP 50. Herein, references to placing the sensor in a particular location or area of the library refers to the reader antenna location and not necessarily to other components of the reader. The cartridge sensors 700 may be positioned and aimed or directed such that cartridges that reside in cells and cartridges that are being transported by the gripper 20 are not detected. The sensitivity of the cartridge sensors 700 may also be adjusted to provide detection only when a cartridge is within an appropriate range, with storage cells and the gripper being outside of the selected range. The sensors 700 may be used to detect a cartridge lying on the floor of the frame or library or may be used to detect a cartridge that falls or passes within their field of view. Locating a cartridge sensor 700 proximate to the floor 8 of each frame 11A-11E, 13, 14 permits the identification of the frame, or position, in which the dropped cartridge 600 is located, thereby assisting a system operator in its recovery. In addition, if cartridge memory readers are used as the cartridge sensors 700, the identity of the dropped cartridge 600, its cartridge type, the media type and/or other information may be read from the cartridge memory 610 and transmitted to the CP 50 or another processor node or control device. Of course, any RFID tag could be configured to provide the same information as cartridge memory 610 and a particular cartridge may comprise more than one RFID tag.

In another embodiment, one or more cartridge sensors 700 may be mounted to the base 26 of the accessor 18. The CP 50 or another processor node or control device may activate the cartridge sensors 700 when the accessor is in motion. In addition, or instead, the CP 50 or another processor node or control device may deactivate the cartridge sensors when the accessor is transporting a cartridge, thus reducing the possibility of detecting a cartridge being held by the gripper 20. Activating the reader refers to energizing the reader antenna to result in a read of any tags that may be present in the radiation field of the antenna. The cartridge sensors 700 may be cartridge memory readers and used to read identification and other information from the cartridge memory 610 of a dropped cartridge 600. Herein, cartridge memory and RFID tag are used to refer to wireless tags. In addition, cartridge memory reader, RFID reader, and cartridge sensor are used to refer to wireless tag readers.

In a further embodiment, the cartridge sensor 700 may be mounted to the accessor 18 or the gripper 20. Preferably, the cartridge memory reader 21, already mounted to the accessor 18 or gripper 20, will also serve as the cartridge sensor 700. If the CP 50 or another processor node or control device has reason to believe that a cartridge is missing, it may direct the gripper 20 to move itself down and to aim the cartridge sensor 700 towards the floor 8 of the library 10. The accessor 18 may then be directed to move along the rails 12 from one location in the library 10 to another in an attempt to detect the missing cartridge. Alternatively, or in addition, the CP 50 or another processor node or control device may direct such a sweep at periodic intervals, for example, when the accessor is otherwise idle.

The CP 50 or another processor node or control device may be programmed to provide one or more different responses, herein referred to as an error indication or an indicator, to the detection of a dropped cartridge. In one embodiment, the CP 50 can notify a system operator that a dropped cartridge has been detected. Such notification may occur at the operator panel 23, at a web page, or at some other user interface of the library. Alternatively, the CP 50 may provide the error indication to an operator or remote computer through remote means using the Internet, a company intranet, phone lines, power lines, cellular or paging networks, RF or optical wireless links, etc. For example, the error indication may be provided via e-mail, a pager, SNMP (Simple Network Management Protocol) traps or notifications, RSS (Really Simple Syndication) or web syndication, SMS (Short Message Service), through a "call-home" function, etc. Based on the information received (which may include the identity of the cartridge and whether there is an immediate need for customer data on the cartridge), the operator is then able to decide when to retrieve the cartridge.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include magnetic media such as floppy disks, hard disk drives, or other magnetic tape or disks; optical media such as CD-ROM, DVD, or other optical tape or disks; electronic media such as PROM, EEPROM, flash PROM, Compactflash™, Smartmedia™, Memory Stick™, or other electronic memories; and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for detecting a dropped data storage cartridge in an automated data storage library.

What is claimed is:

1. A method for detecting a data storage cartridge on a floor of an automated data storage library, the library including an automated accessor to transport cartridges between storage cells and data storage drives, the cartridges including an information-storing cartridge memory, the method comprising:
   providing a cartridge memory reader in the automated data storage library;
   positioning the reader to detect the presence of a cartridge memory on a floor of the library;
   activating the reader; and
   generating an error indication if a cartridge memory is detected, thereby indicating the presence of a cartridge on the floor of the library.

2. The method of claim 1, wherein positioning the reader comprises mounting the cartridge memory reader to a base of the accessor.

3. The method of claim 2, wherein activating the reader comprises activating the cartridge memory reader when the accessor is in motion.

4. The method of claim 1, wherein:
   the method further comprises mounting the reader to a cartridge gripper of the accessor; and
   positioning the reader comprises moving the gripper proximate to the floor of the library and moving the accessor from a first location in the library to a second location in the library whereby a cartridge memory in a cartridge on the floor of the library is detectable by the cartridge memory reader.

5. The method of claim 1, wherein positioning the reader comprises securing the cartridge memory reader proximate to the floor of the library.

6. The method of claim 1, wherein:
   the automated data storage library includes a plurality of library frames; and
   positioning the reader comprises securing a reader proximate to the floor in each of one or more of the library frames.

7. The method of claim 6, further comprising identifying the storage frame in which a cartridge memory is detected.

8. The method of claim 1, further comprising restricting movement of the accessor within the library if a cartridge is detected on the floor of the library.

9. A computer program product of a computer readable medium usable with a programmable computer, the computer program product having computer-readable code embodied therein for detecting the presence of a data cartridge on the floor of an automated data storage library, the computer-readable code comprising instructions for:
   activating a cartridge memory sensor mounted in the library to detect the presence of a cartridge memory in a data cartridge on the floor of the library; and generating an error indication if a cartridge memory is detected, thereby indicating the presence of a cartridge on the floor of the library.

10. The computer program product of claim 9, wherein the instructions for activating a cartridge memory sensor comprise instructions for:
    activating a cartridge memory sensor mounted to a base of the accessor; and
    activating the sensor when the accessor is in motion transporting a cartridge.

11. The computer program product of claim 9, wherein:
    the instructions for activating a cartridge memory sensor comprise instructions for activating a cartridge memory sensor mounted to an accessor gripper; and
    the computer-readable code further comprises instructions for moving the gripper proximate to the floor of the library and moving the accessor from a first location in the library to a second location in the library whereby a cartridge memory in a cartridge on the floor of the library is detectable by the sensor.

12. The computer program product of claim 9, wherein the instructions for activating a cartridge memory sensor comprise instructions for activating a cartridge sensor mounted proximate to the floor of the housing.

13. The computer program product of claim 9, wherein:
    the instructions for activating a cartridge memory sensor comprise instructions for activating cartridge memory sensors mounted proximate to the floor in one or more storage frames of the library; and
    the computer-readable code further comprises instructions for identifying the frame in which a cartridge memory is detected.

* * * * *